(12) United States Patent
Toffan et al.

(10) Patent No.: US 8,020,367 B2
(45) Date of Patent: Sep. 20, 2011

(54) NOZZLE WITH YAW VECTORING VANE

(75) Inventors: Michael Jay Toffan, Mason, OH (US);
James Lee Salmon, Cincinnati, OH (US); Ronald Clement Hollett, Daytona Beach, FL (US); Arthur McCardle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 981 days.

(21) Appl. No.: 11/687,539

(22) Filed: Mar. 16, 2007

(65) Prior Publication Data
US 2009/0064660 A1 Mar. 12, 2009

(51) Int. Cl.
*F02K 1/00* (2006.01)
(52) U.S. Cl. .......................... 60/228; 60/230
(58) Field of Classification Search .................. 60/228, 60/230, 232, 770; 239/265.25
See application file for complete search history.

(56) References Cited

U.S. PATENT DOCUMENTS

| | | | |
|---|---|---|---|
| 2,758,805 A | 8/1956 | Graham | |
| 4,848,664 A | 7/1989 | Thayer | |
| 4,978,071 A | 12/1990 | MacLean et al. | |
| 5,016,818 A | 5/1991 | Nash et al. | |
| 5,082,181 A | 1/1992 | Brees et al. | |
| 5,092,524 A | 3/1992 | Garrett et al. | |
| 5,170,964 A * | 12/1992 | Enderle et al. | 244/52 |
| 5,261,604 A | 11/1993 | Meyer | |
| 5,294,055 A | 3/1994 | Garrett et al. | |
| 5,437,412 A | 8/1995 | Carletti | |
| 5,511,745 A | 4/1996 | Faupell et al. | |
| 5,833,139 A | 11/1998 | Sondee et al. | |
| 6,382,559 B1 * | 5/2002 | Sutterfield et al. | 244/23 A |
| 6,676,072 B1 * | 1/2004 | Kim et al. | 244/3.23 |
| 6,691,948 B1 * | 2/2004 | Kim et al. | 244/3.23 |
| 7,096,662 B2 | 8/2006 | Wehner | |

(Continued)

FOREIGN PATENT DOCUMENTS

GB 789836 10/1955

(Continued)

OTHER PUBLICATIONS

Harry Walton, "The How and Why of Mechanical Movements", A Popular Science Book, Popular Science Publishing Company, Inc., A Times Mirror Subsidiary, pp. 20 and 21.

(Continued)

*Primary Examiner* — Ehud Gartenberg
*Assistant Examiner* — Vikansha Dwivedi
(74) *Attorney, Agent, or Firm* — William Scott Andes; Steven J. Rosen

(57) ABSTRACT

An exhaust vane disposed in a divergent section of an aircraft gas turbine engine exhaust nozzle is sideways pivotable about a vane pivot axis. The nozzle vane pivot axis may be centrally located at an unvectored nozzle throat. Transversely spaced apart upper and lower tips of the exhaust vane may be incorporated to sealingly engage a nozzle outer wall along upper and lower surfaces of the outer wall of the nozzle. The exhaust vane has flat or contoured vane sidewalls and contoured vane sidewalls may be concave. The exhaust vane may have transversely biased apart upper and lower vane sections extending transversely inwardly from the upper and lower tips of the exhaust vane respectively. The exhaust vane may be articulated having upstream and downstream sections separately sideways pivotable about the vane pivot axis and a second pivot axis downstream of and parallel to the vane pivot axis respectively.

56 Claims, 20 Drawing Sheets

U.S. PATENT DOCUMENTS

| | | | |
|---|---|---|---|
| 7,406,821 B2* | 8/2008 | Hervio | 60/228 |
| 7,900,460 B2* | 3/2011 | Harefors | 60/770 |
| 2007/0095972 A1 | 5/2007 | Buffenoir et al. | |

FOREIGN PATENT DOCUMENTS

| | | |
|---|---|---|
| GB | 2159476 | 12/1985 |
| GB | 2428029 | 1/2007 |
| JP | 60237147 | 5/1984 |
| JP | 9236048 | 2/1996 |
| WO | WO0118376 | 3/2001 |

OTHER PUBLICATIONS

Search Report, GB0804599.9, Jul. 2, 2008, 4 pages.
Search Report, GB0804599.9, Aug. 5, 2008, 2 pages.

* cited by examiner

NOZZLE WITH YAW VECTORING VANE

BACKGROUND OF THE INVENTION

Field of the Invention

The invention relates to aircraft gas turbine engine two dimensional vectoring nozzles and, more particularly, for such nozzles designed to shift nozzle exhaust flow sideways to effect vectoring.

Aircraft designers and particularly those designing high speed highly maneuverable military aircraft are constantly seeking better ways for controlling the aircraft and increasing its maneuverability in flight. These are needed for anti-aircraft missile avoidance and other combat maneuvers. Additionally, aircraft designers are trying to improve short take-off and landing capabilities of aircraft. Exhaust systems, particularly for modern, high speed, and military aircraft have been adapted to provide a high degree of maneuverability over a wide variety of flight conditions including altitude, speed and Mach number while maintaining cruise efficiency.

Aircraft maneuverability may be provided by aircraft control surfaces such as wing flaps or ailerons or vertical fins or rudders. Aircraft control surfaces, however, are somewhat limited in their effectiveness because of large differences in operational flight conditions such as air speed. Aircraft control surfaces also increase an aircraft's radar signature making it more vulnerable to anti-aircraft fire and missile. Thrust vectoring nozzles, though often more complicated, are more effective because they allow large thrust loads to be quickly applied in the pitch and yaw direction of the aircraft, thereby, providing the aircraft with enhanced maneuverability which is relatively independent of air speed. Thrust vectoring nozzles are complex, heavy, and expensive. Other thrust vectoring methods include use of nozzle internal fluidic injection and/or mechanical flow diversion devices to skew the thrust. These thrust vectoring methods are effective but may be complex, heavy, costly and/or marginally effective.

It is, thus, highly desirable to provide an aircraft gas turbine engine with a thrust vectoring nozzle that is not complex, nor heavy, nor expensive, and yet, very effective for thrust vectoring.

SUMMARY OF THE INVENTION

An aircraft gas turbine engine yaw vectoring exhaust nozzle includes an exhaust vane disposed in a divergent section of the nozzle and is sideways pivotable about a vane pivot axis extending transversely between upper and lower surfaces of an outer wall of the nozzle. The exhaust vane extends longitudinally downstream and transversely between the upper and lower surfaces. The exhaust vane is used to vector thrust by turning or vectoring an exhaust flow sideways or in the yaw direction.

In an exemplary embodiment of the nozzle, the vane pivot axis is centrally located at an unvectored nozzle throat. Transversely spaced apart upper and lower tips of the exhaust vane sealingly engage the nozzle outer wall along the upper and lower surfaces of the outer wall. The exhaust vane may have flat vane sidewalls or contoured vane sidewalls and the contoured vane sidewalls may be contoured concave.

Another exemplary embodiment of the exhaust vane is an articulated exhaust vane having separately sideways pivotable upstream and downstream sections. The upstream section is pivotable about the vane pivot axis and the downstream section is pivotable about a second pivot axis downstream of and parallel to the vane pivot axis. The upstream section has a downstream end and the downstream section has an upstream end. The upstream and downstream ends may be nested at a joint with a first one of the upstream and downstream ends having a concave end surface and a second one of the upstream and downstream ends, having a convex end surface. The downstream end of the upstream section may have the concave end surface and the upstream end of the downstream section may have the convex end surface. The convexly-shaped upstream end of the downstream section is rotatable within the concavely-shaped upstream end of the downstream section.

Another embodiment of the exhaust vane includes transversely biased apart upper and lower vane sections extending transversely inwardly from the upper and lower tips of the exhaust vane, respectively. A first one of the upper and lower vane sections is hollow and a second one of the upper and lower vane sections is partially disposed within and in sliding engagement with the first one of the upper and lower vane sections.

DETAILED DESCRIPTION OF THE INVENTION

Figure 1:
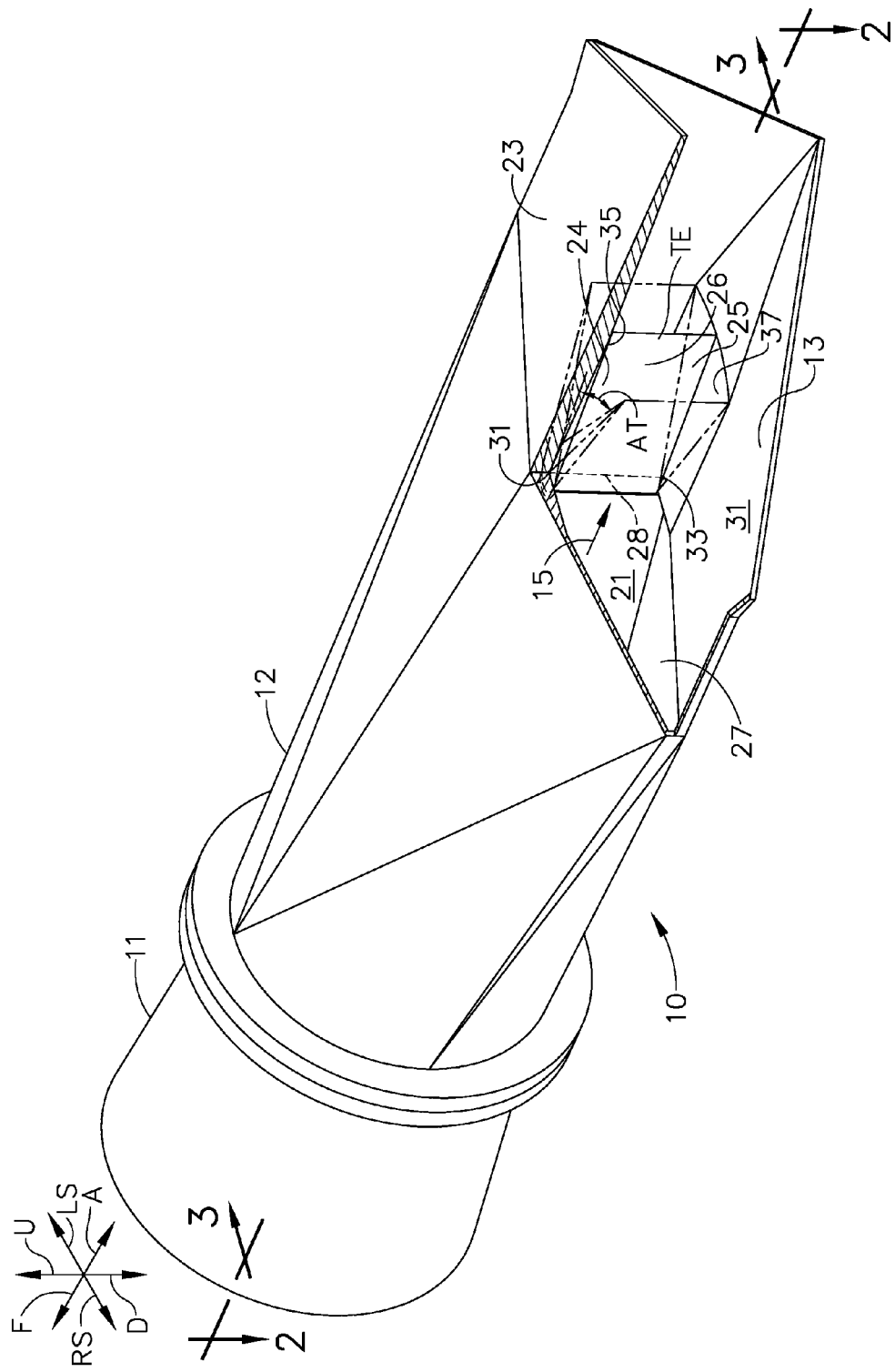
FIG. 1 is a partially cut-away perspective view illustration of a yaw vectoring exhaust nozzle with a sideways pivotable exhaust vane in a divergent section of the nozzle.
Figure 2:
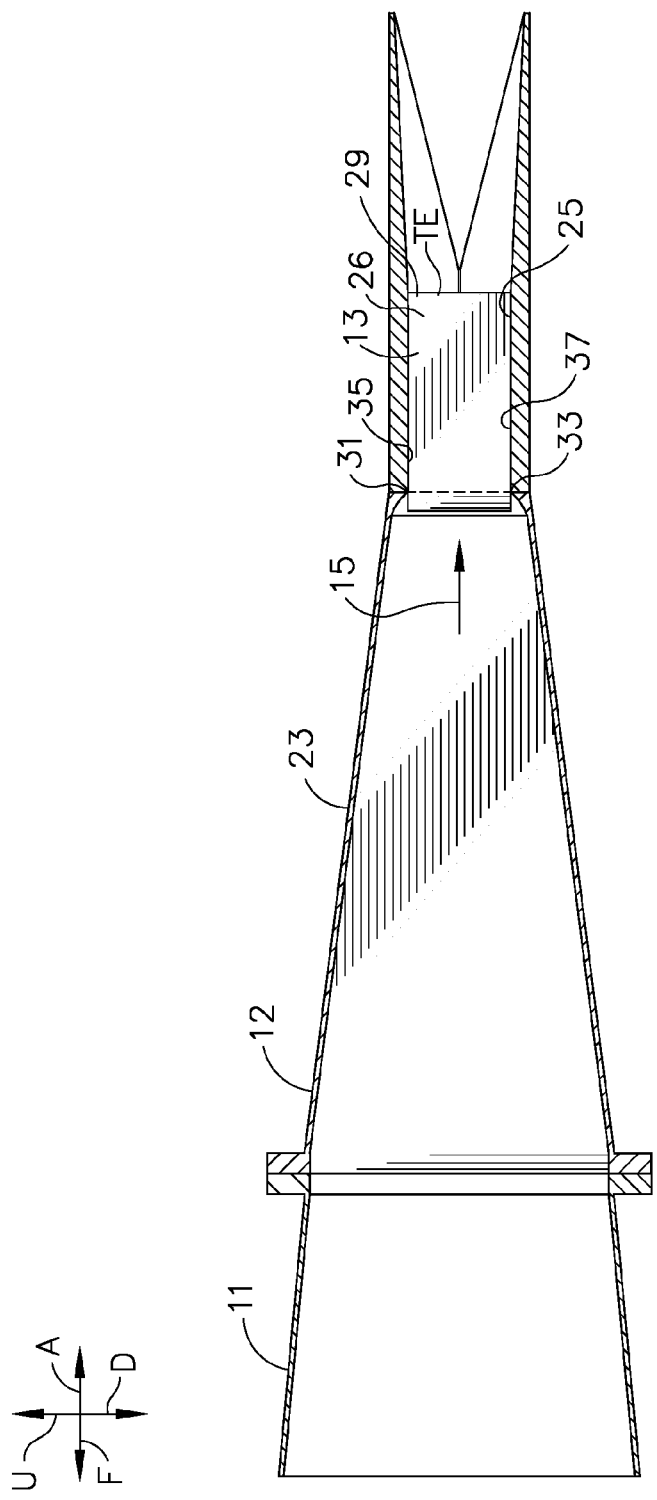
FIG. 2 is a cross-sectional view illustration of the nozzle taken through 2-2 in FIG. 1.

Illustrated in FIGS. 1 and 2 is an exemplary embodiment of an aircraft gas turbine engine yaw vectoring exhaust nozzle 10 designed to provide yaw vectoring of an exhaust flow 15 or vector the exhaust flow 15 sideways. The vectorable nozzle 10 is connected to an aft end of an aircraft gas turbine engine represented by an engine exhaust duct 11 and includes an outer wall 23. At this point, it is important to define the conventions used to describe the directions and frame of references for the flow, the movement of various nozzle elements. Forward and aft directions F, A are illustrated in FIG. 1 by respective arrows. The exhaust flow 15 flows downstream which is in the aft direction. Left and right sideway directions LS and RS are illustrated in FIG. 1 by respective arrows from a frame of reference forward looking aft. Up and down directions U, D are illustrated in FIG. 1 by respective arrows. Upper and lower elements and right and left elements are used only for describing the nozzle within the illustrated reference frame.

Figure 3:
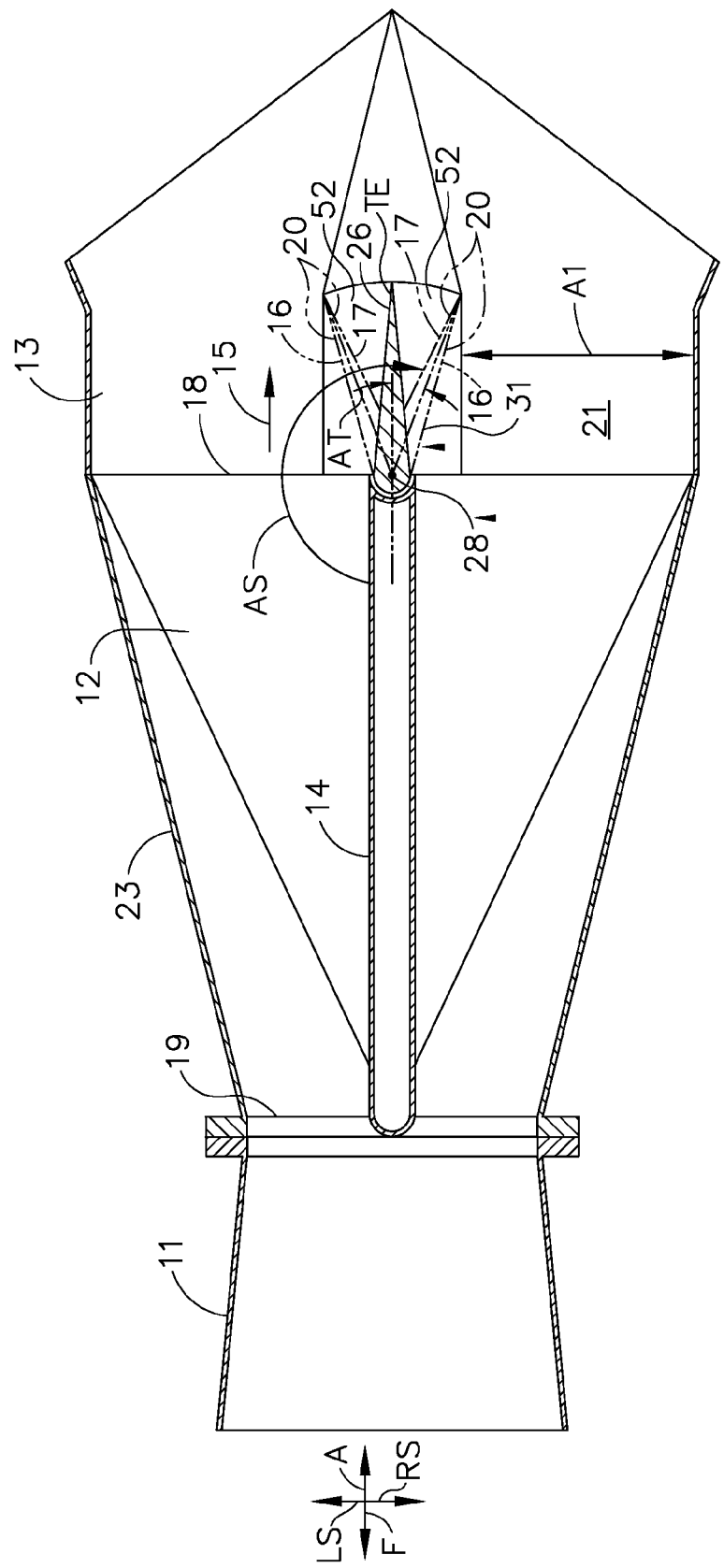
FIG. 3 is a cross-sectional view illustration of the nozzle taken through 3-3 in FIG. 1.

Referring to FIGS. 1, 2, and 3, the vectoring exhaust nozzle 10 includes in downstream serial flow relationship a convergent section 12 and a divergent section 13 containing an exhaust flowpath 21 therein. An unvectored throat 18 is generally located between the convergent and divergent sections. An outer wall 23 extends longitudinally and downstream and is illustrated as having a diamond-shaped cross-section 27 perpendicular to the longitudinal direction in a plane defined by the transverse, up and down directions U and D and by the left and right sideway directions LS and RS. The outer wall 23 may have a differently shaped cross-section. The convergent section 12 also functions as a transition section, transitioning the cross-sectional flow area of the exhaust flowpath 21 from a circular shape to the diamond-shaped cross-section 27.

Figure 4:
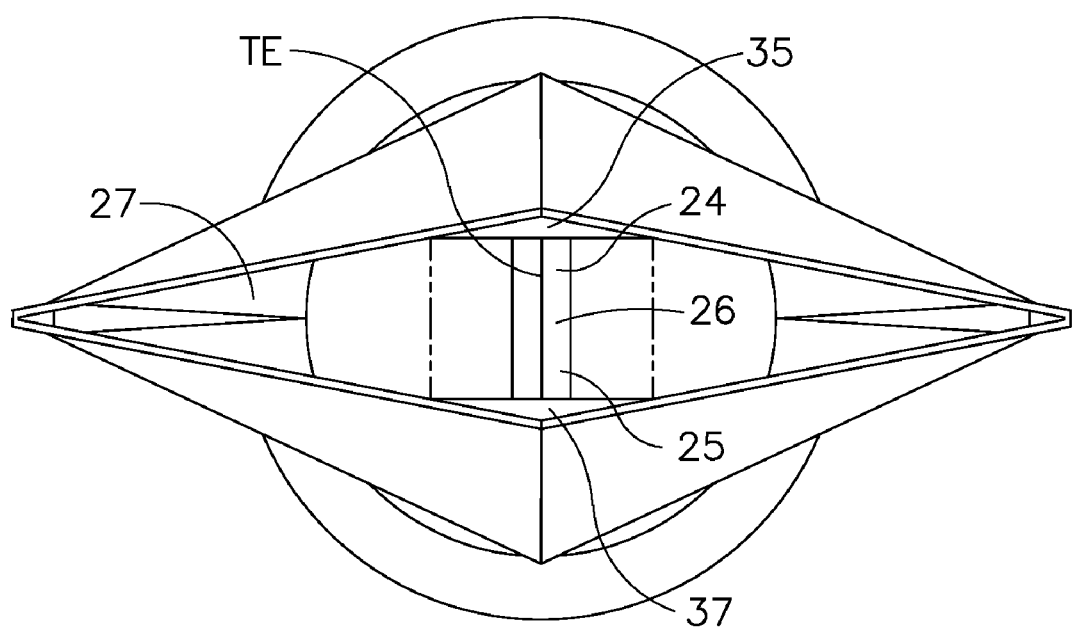
FIG. 4 is an aft looking forward elevational view illustration of the nozzle illustrated in FIG. 1.

A hollow center strut 14 functions as a flow splitter and extends aftwardly from a nozzle inlet 19 of the convergent section 12 to a variable angle or sideways pivotable exhaust vane 26 disposed in the divergent section 13 and exhaust flowpath 21 of the nozzle. The exhaust vane 26 is sideways pivotable about a vane pivot axis 28. The exhaust vane 26 extends longitudinally downstream and transversely between upper and lower surfaces 35, 37 of the outer wall 23 as further illustrated in FIG. 4. The exhaust vane 26 is used to vector thrust by turning or vectoring the exhaust flow 15 sideways or in the yaw direction indicated by the arrows labeled as the left and right sideway directions LS and RS. In the exemplary embodiment illustrated herein, the vane pivot axis 28 is centrally located at the unvectored nozzle throat 18. Transversely spaced apart upper and lower tips 24, 25 of the exhaust vane 26 sealingly engage the nozzle outer wall 23 along the upper and lower surfaces 35, 37 of the outer wall 23.

Sweep areas 52, illustrated in FIG. 3, along the upper and lower surfaces 35, 37 are defined herein as maximum areas swept out by maximum amount pivoting or rotation of the exhaust vane 26 about the vane pivot axis 28. The upper and lower surfaces 35, 37 are contoured to accommodate the maximum amount of pivoting or rotation of the exhaust vane 26 about the vane pivot axis 28. The exemplary outer wall 23 illustrated herein is diamond-shaped and the upper and lower surfaces 35, 37 are thus angled with respect to the vane pivot axis 28 except for the sweep areas 52 along the upper and lower surfaces 35, 37 which are flat. The sweep areas 52 are flat and perpendicular to the vane pivot axis 28 in order to provide good sealing between the exhaust vane 26 and the upper and lower surfaces 35, 37.

Figure 5:
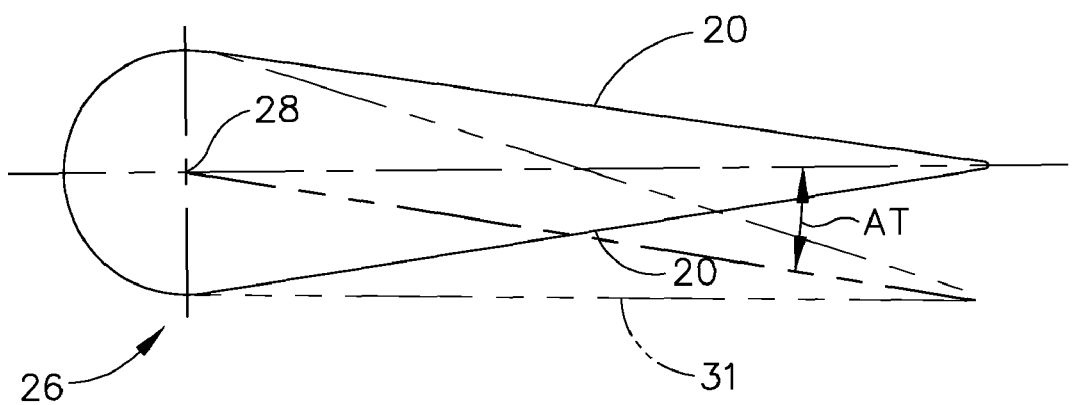
FIG. 5 is a cross-sectional view illustration of the vane illustrated in FIG. 1.

A trailing edge TE and cross-sectional shape of the exhaust vane 26 may be designed to be consistent with RCS, structural and aerodynamic requirements. The exhaust vane shape in the plan view or of the vane's sidewalls is important to exhaust system performance. Functionally, one of the least complicated designs is an exhaust vane 26 with a single vane pivot axis 28 and straight or flat vane sidewalls 20 as illustrated in FIGS. 1, 2, and 5. It is easy to design and manufacture. However, the exhaust vane 26 with the flat sidewalls 20, in most fixed area exhaust nozzles, reduces a first flow area A1, illustrated in FIG. 15, between a pressure side 16 of the exhaust vane's sidewalls and the outer wall 23 of the nozzle, below a minimum requirement by causing the exhaust flow 15 to discharge to the pressure side 16 of the exhaust vane's sidewalls. Additionally, when the exhaust vane 26 is partially or fully deployed or angled, a suction side flow angle AS, illustrated in FIG. 3, between the exhaust flow 15 and a suction side 17 of the sidewalls 20 may become great enough to cause flow separation and poor suction side performance.

Figure 6:
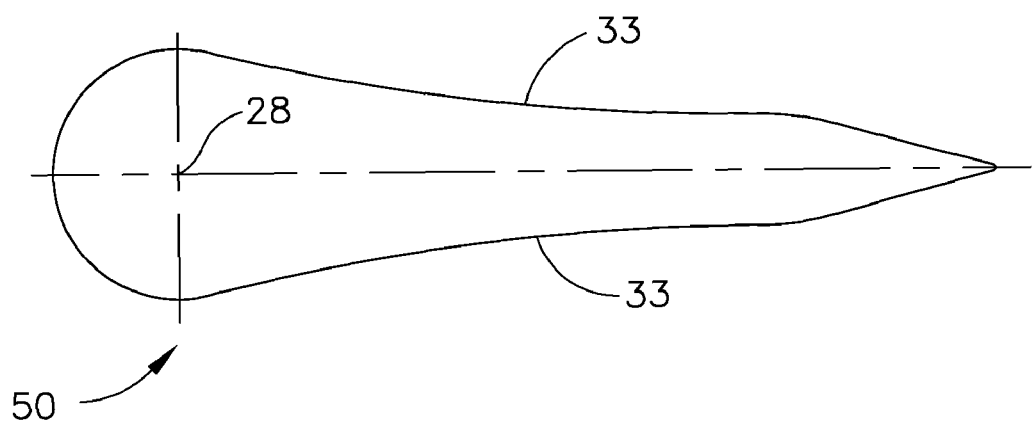
FIG. 6 is a cross-sectional view illustration of a sideways pivotable contoured exhaust vane.

Contouring the shape of the sidewalls 20 of the exhaust vane 26 may be used to overcome these potential problems. The shape of the exhaust vane's sidewalls or profile may be designed such that when the exhaust vane is angle deployed, the gas stream flow area is not reduced below what is required by the engine. Illustrated in FIG. 6 is a first alternative embodiment of the exhaust vane 26 which is referred to herein as a contoured exhaust vane 50. The contoured exhaust vane 50 includes contoured vane sidewalls 33 and the particular embodiment of the exhaust vane 26 illustrated herein includes concave-shaped contoured vane sidewalls 33. The contoured exhaust vane 50 and the flat sided exhaust vane 26 may have a potential separation problem on the suction sides.

Figure 7:
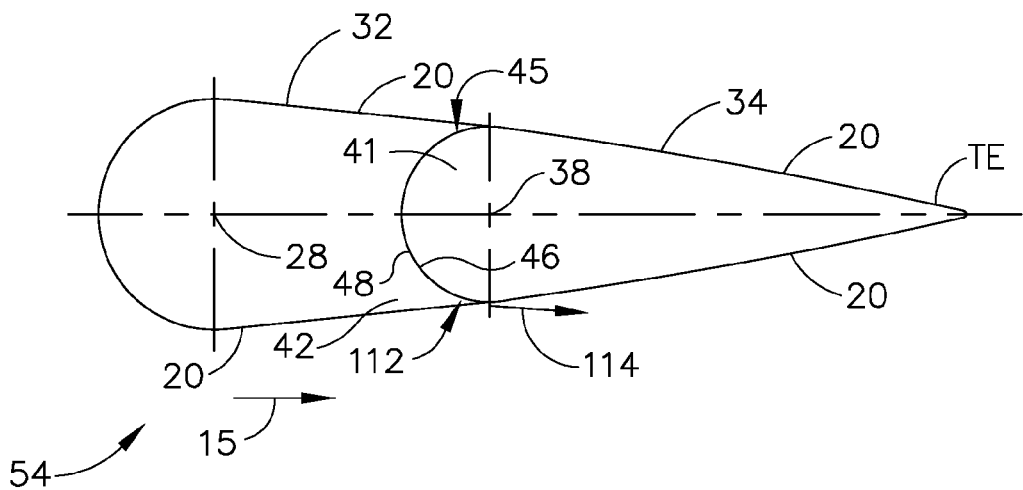
FIG. 7 is a cross-sectional view illustration of a sideways pivotable articulated exhaust vane.
Figure 14:
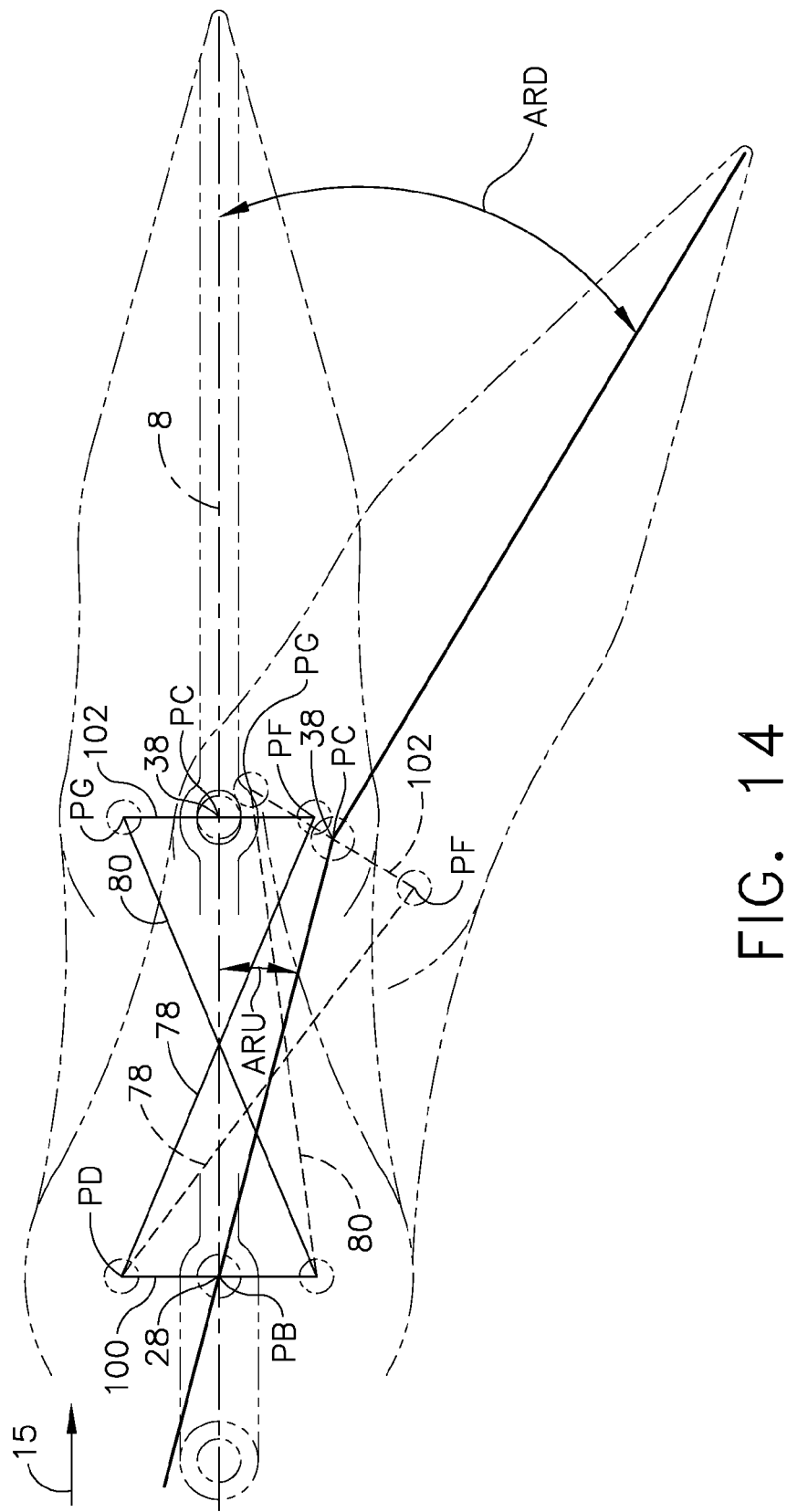
FIG. 14 is a schematical view illustration of an articulated position of the actuation mechanism illustrated in FIG. 10.

Illustrated in FIG. 7 is a second alternative embodiment of the exhaust vane 26 referred to herein as an articulated exhaust vane 54. The articulated exhaust vane 54 includes separately sideways pivotable upstream and downstream sections 32, 34. The upstream section 32 is pivotable about the vane pivot axis 28 and the downstream section 34 is pivotable about a second pivot axis 38 located downstream of and parallel to the vane pivot axis 28. The upstream section 32 has a downstream end 42 and the downstream section 34 has an upstream end 41. The upstream and downstream ends 41, 42 are illustrated being nested within a pivotable joint 45 with a first one of the upstream and downstream ends 41, 42 having a concave end surface 46 and a second one of the upstream and downstream ends 41, 42 having a convex end surface 48. The downstream end 42 of the upstream section 32 is illustrated having the concave end surface 46 and the upstream end 41 of the downstream section 34 is illustrated having the convex end surface 48. The convexly-shaped upstream end 41 of the downstream section 34 is rotatable within the concavely-shaped upstream end 41 of the downstream section 34. The upstream and downstream sections 32, 34 are rotatable through different upstream and downstream angles of rotation ARU, ARD respectively with respect to an exhaust flow direction 8 of the exhaust flow 15 upstream of the exhaust vane 26 as illustrated in FIG. 14.

Figure 8:
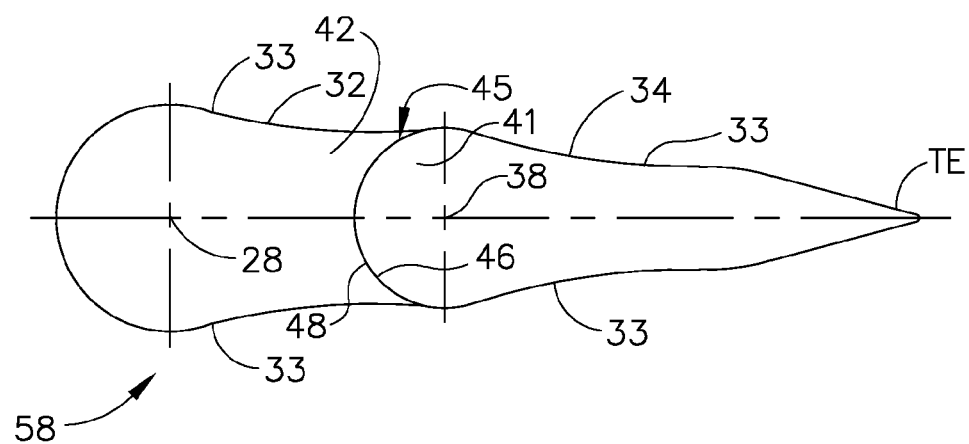
FIG. 8 is a cross-sectional view illustration of a sideways pivotable articulated and contoured exhaust vane.

A third alternative embodiment of the exhaust vane 26 is illustrated in FIG. 8 and combines features of the articulated and the contoured exhaust vanes and is referred to herein as an articulated contoured exhaust vane 58. The articulated contoured exhaust vane 58 includes separately sideways pivotable upstream and downstream sections 32, 34. The upstream section 32 is pivotable about the vane pivot axis 28 and the downstream section 34 is pivotable about a second pivot axis 38 located downstream of and parallel to the vane pivot axis 28. The upstream section 32 has a downstream end 42 and the downstream section 34 has an upstream end 41.

The upstream and downstream ends 41, 42 are illustrated as being nested with a first one of the upstream and downstream ends 41, 42 having a concave end surface 46 and a second one of the upstream and downstream ends 41, 42 having a convex end surface 48. The downstream end 42 of the upstream section 32 is illustrated having the concave end surface 46 and the upstream end 42 of the downstream section 34 is illustrated having the convex end surface 48. The convexly-shaped upstream end 41 of the downstream section 34 is rotatable within the concavely-shaped upstream end 41 of the downstream section 34 as further illustrated in FIG. 16. The sideways pivotable upstream and downstream sections 32, 34 include contoured vane sidewalls 33 and the particular embodiment of the articulated contoured exhaust vane 58 illustrated herein includes concave-shaped vane sidewalls 33.

The articulated exhaust vane 54 is designed to optimize performance of the exhaust vane by turning the exhaust flow 15 in segments rather than abruptly changing flow direction as done with the one piece embodiments of the exhaust vane illustrated in FIGS. 1, 2, 5, and 6. The articulated exhaust vane 54 allows the exhaust flow 15 to be turned through greater turn angles AT as illustrated in the FIGS. without flow separation. The curved contoured vane sidewalls 33 and in particular the concave-shaped vane sidewalls 33 of the articulated contoured exhaust vane 58 avoids reducing minimum flow area through the turn angle AT.

Figure 16:
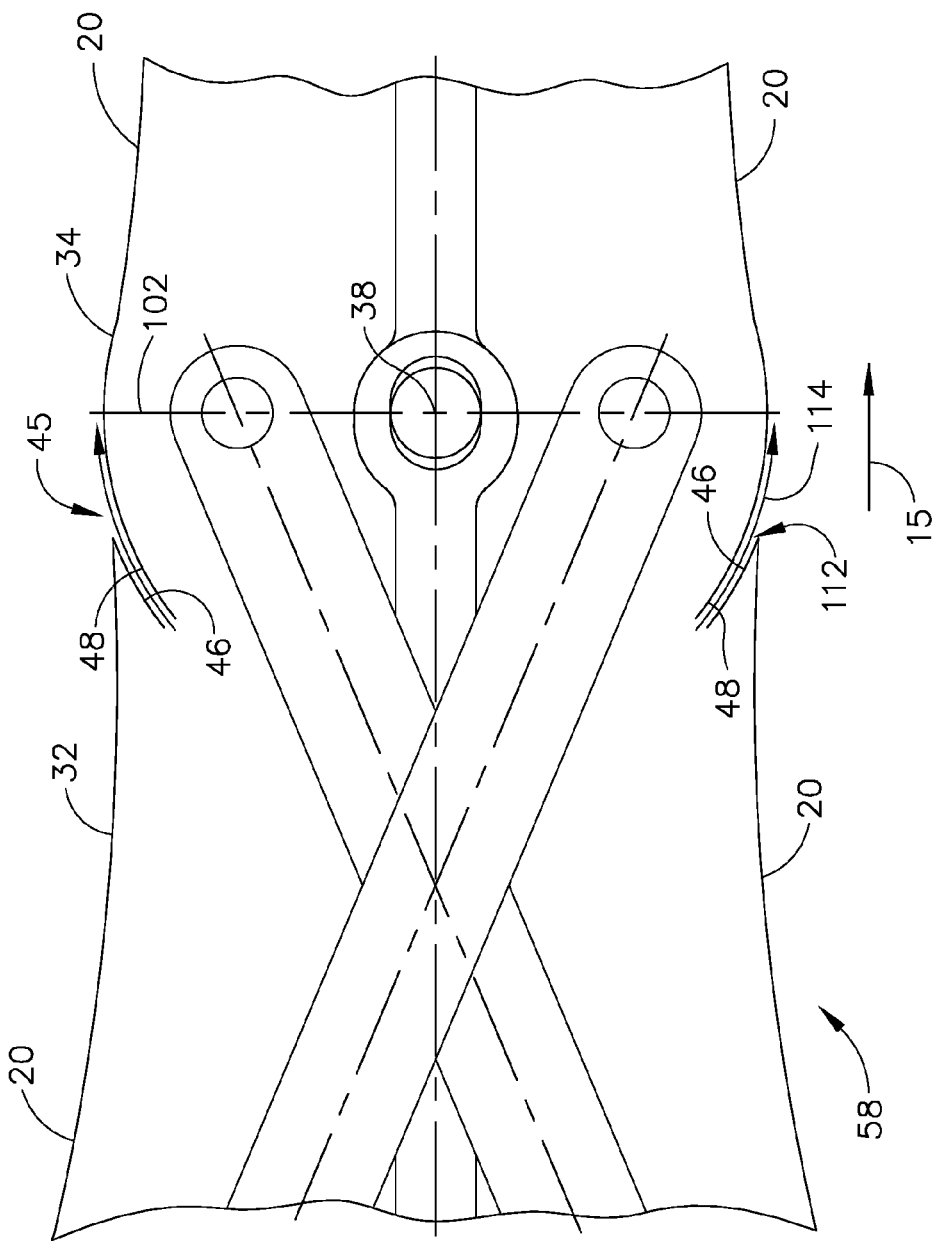
FIG. 16 is an enlarged cross-sectional view illustration of nested ends of the pivotable upstream and downstream sections of the vane illustrated in FIG. 15.

A cooling air injection slot 112, illustrated in FIG. 16, may be used to provide injection of a cooling air 114 designed to be entrained in a boundary layer along the sides of the downstream section 34. The injection cooling 112 may be used for the nested arrangement of the downstream section 34 nested within the upstream section 32 for both the articulated exhaust vane 54 illustrated in FIG. 7 and the articulated contoured exhaust vane 58 illustrated in FIG. 8. The cooling air 114 may be taken from a fan of the engine. By nesting the downstream section 34 within the upstream section 32 as illustrated in FIG. 16, there are no upstream or forward facing steps at the pivotable joint 45 to cause additional flow losses in the exhaust flow 15.

Illustrated in FIGS. 9-13 is a first exemplary embodiment of an actuation mechanism 60 illustrated for actuating the articulated contoured exhaust vane 58 illustrated in FIG. 8 and may also be used for actuating the articulated exhaust vane 54 illustrated in FIG. 7. The actuation mechanism 60 includes at least one linear or other actuator 61 illustrated schematically in FIG. 11 and would most likely be mounted outside of the exhaust flowpath 21 and the outer wall 23. An actuator rod 59 of the actuator 61 is operably connected to a forward drive link 70 by a forward pivotal joint 36 at a forward pivot point PA at an upstream end 89 of the forward drive link 70. The actuator rod 59 of the linear actuator is connected by a connecting pin 63 to the forward joint.

The upstream section 32 of the articulated contoured exhaust vane 58 is fixedly attached to the forward drive link 70 as illustrated schematically by an upstream ground connection 71 between the upstream section 32 and the forward drive link 70. The downstream section 34 of the articulated contoured exhaust vane 58 is fixedly attached to an aft drive link 74 as illustrated schematically by a ground connection 73 between the downstream section 34 and the aft drive link 74. The forward drive link 70 is a lever which is pivotably mounted on a forward pin 72 at a mid pivot point PB located at a longitudinally downstream extending section 76 of the forward drive link 70, thus, forming a lever arm 77 between the forward pivot point PA and the mid pivot point PB.

The aft drive link 74 is pivotably connected to the forward drive link 70 along the second pivot axis 38 by an aft pivotal joint 92 at an aft pivot point PC at a downstream end 94 of the forward drive link 70. Thus, rotation of the upstream section 32 of the articulated contoured exhaust vane 58 is accomplished by rotating the forward drive link 70 about the vane pivot axis 28 by applying a force at the forward pivot point PA at the upstream end 89 of the forward drive link 70. The forward drive link 70 may be integrally formed with the upstream section 32 of the articulated contoured exhaust vane 58. The aft drive link 74 may be integrally formed with the downstream section 34 of the articulated contoured exhaust vane 58.

Figure 9:
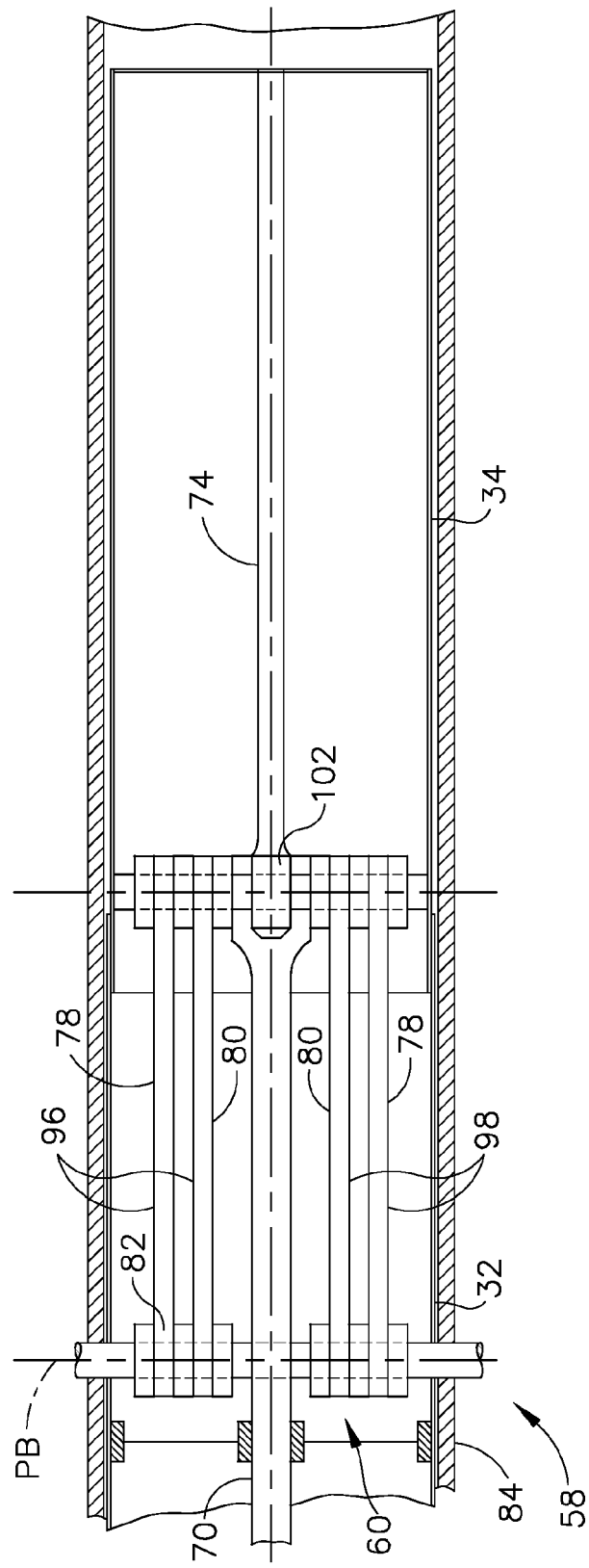
FIG. 9 is a cross-sectional view illustration of an actuation mechanism for the sideways pivotable articulated and contoured exhaust vane illustrated in FIG. 8 taken through 2-2 in FIG. 1.
Figure 10:
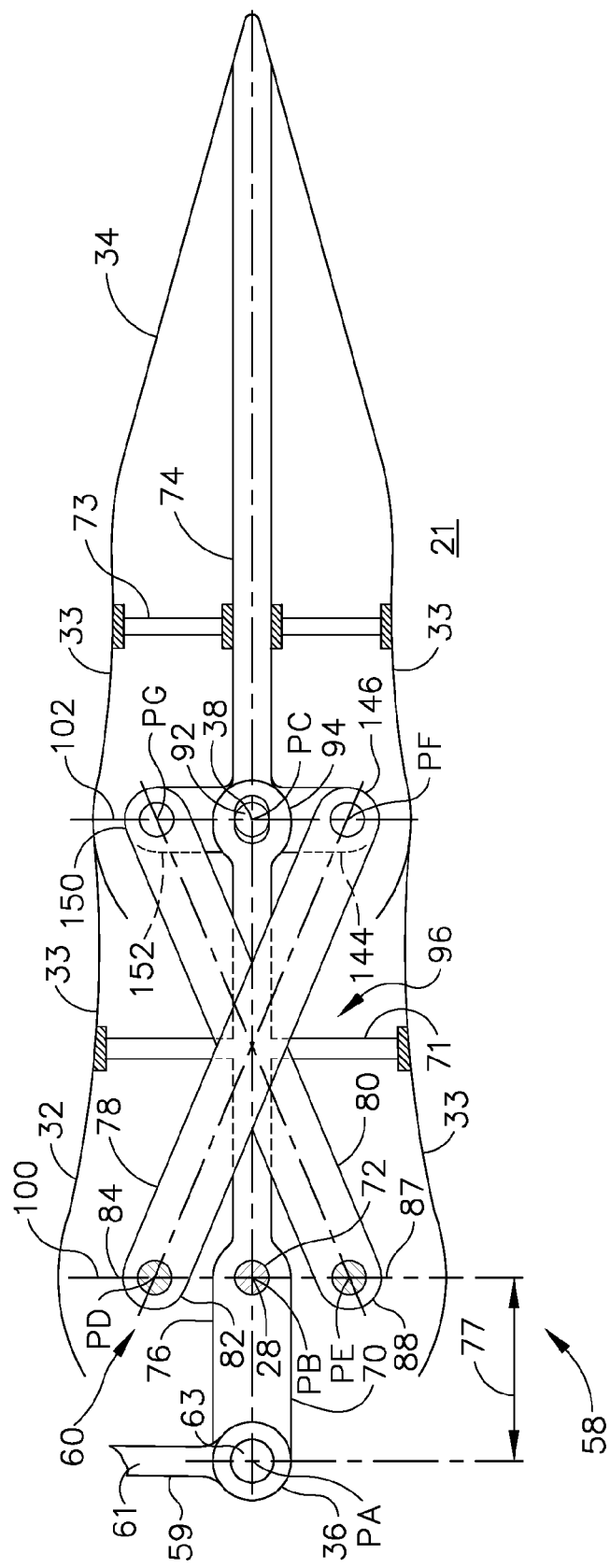
FIG. 10 is a top looking down elevational view illustration of the actuation mechanism illustrated in FIG. 9.
Figure 11:
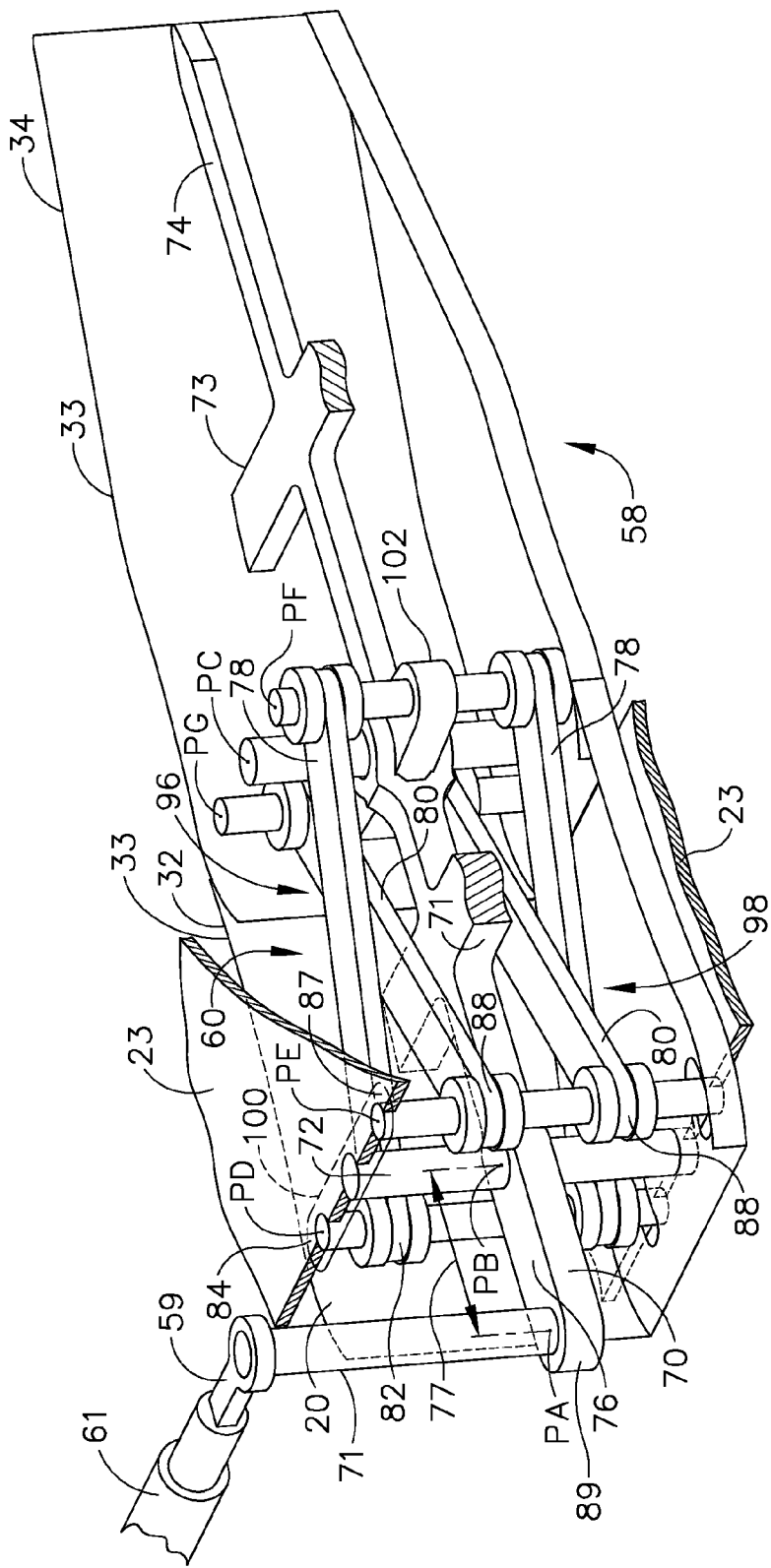
FIG. 11 is a perspective view illustration of the actuation mechanism illustrated in FIG. 10.
Figure 12:
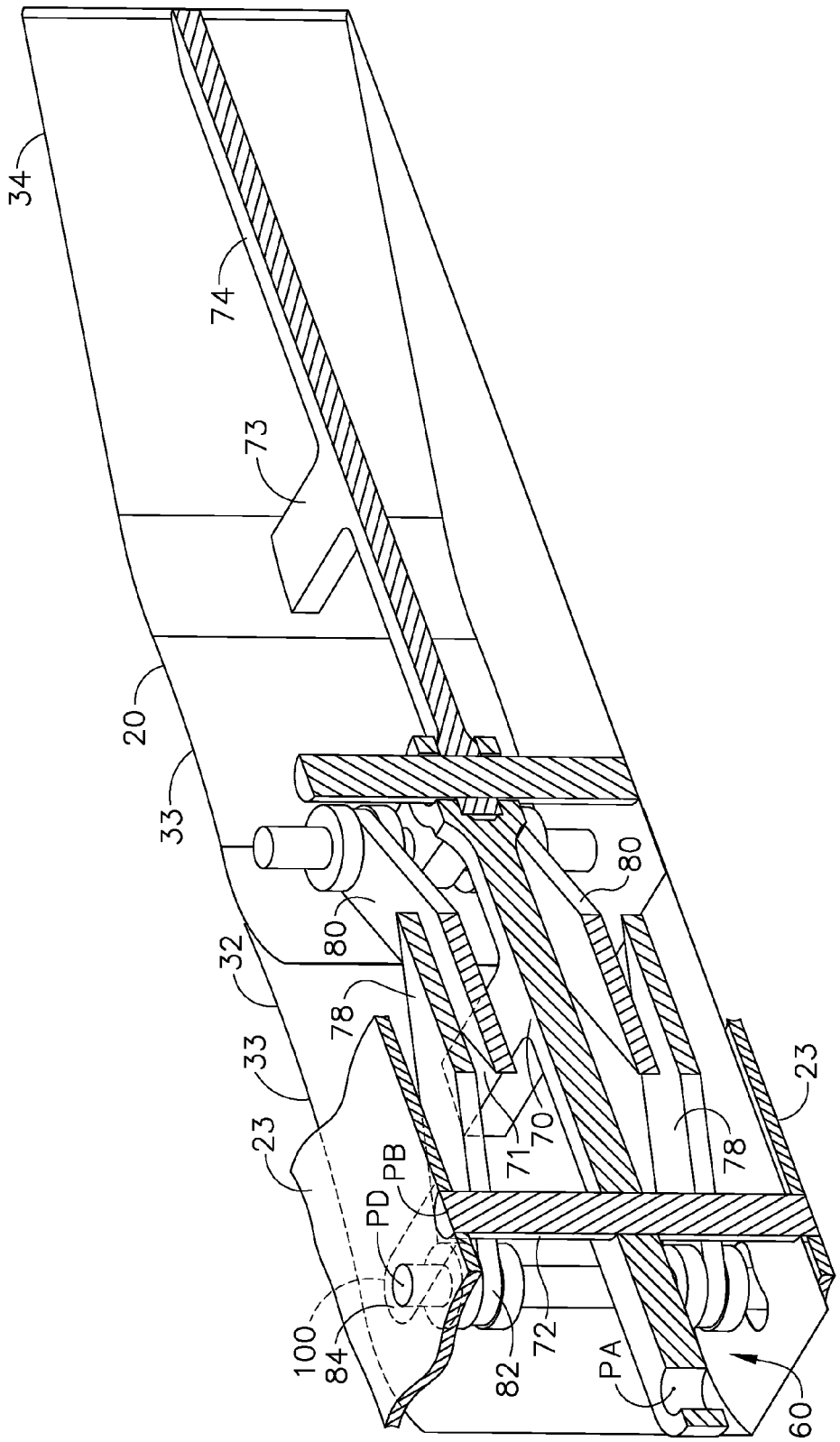
FIG. 12 is a cutaway perspective view illustration of the actuation mechanism illustrated in FIG. 11.
Figure 13:
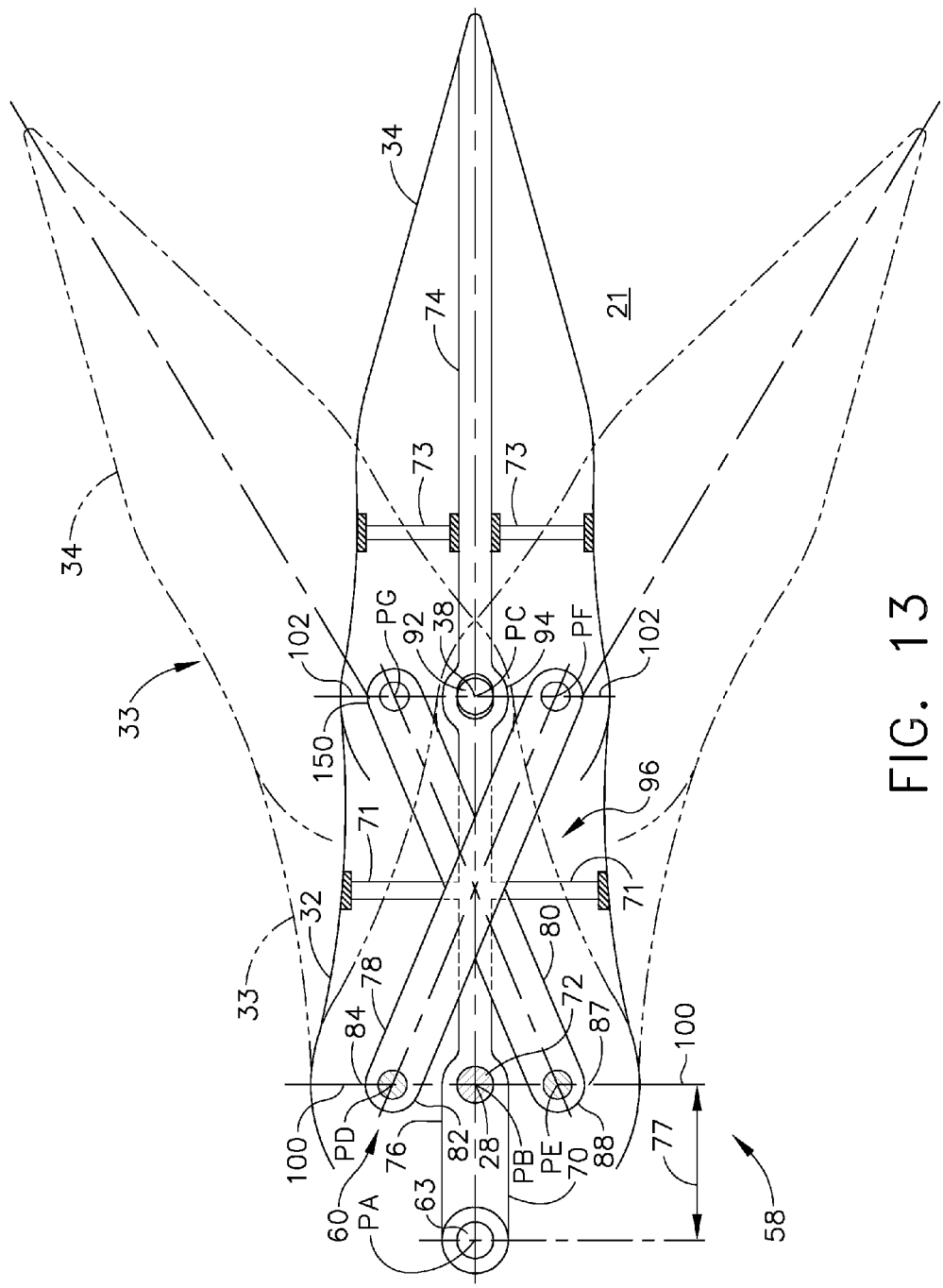
FIG. 13 is a top looking down elevational view illustration of two articulated positions of the vane illustrated in FIG. 10.

The first exemplary embodiment of the actuation mechanism 60 includes upper and lower three bar cross linkages 96, 98 as illustrated in FIG. 9. An exemplary one of the three bar cross linkages, the upper three bar cross linkage 96, is schematically illustrated in FIGS. 10-13 and diagrammatically in FIG. 14. The three bar cross linkage includes left and right forward pivot points PD and PE, respectively, which are relatively fixed with respect to the outer wall 23 in an area 100 of the outer wall 23 indicated by a dashed line labeled 100 in FIGS. 11 and 12. An aft bar 102 is fixedly connected to the downstream section 34 of the articulated contoured exhaust vane 58.

A left to right bar 78 is pivotable about the left forward pivot point PD at a forward end 82 of the left to right bar 78 along a line normal to a left end 84 of the area 100. The left to right bar 78 extends downstream or aftwardly from the left forward pivot point PD and crosses over a right to left bar 80. The right to left bar 80 is pivotable about the right forward pivot point PE at a forward end 88 of the right to left bar 80 and along a line normal to a right end 87 of the area 100. The left to right bar 78 is pivotably connected at its aft end 146 to the right aft pivot point PF at a right end 144 of the aft bar 102. The right to left bar 80 is pivotably connected at its aft end 150 to a left aft pivot point PG at a left end 152 of the aft bar 102. This type of three bar linkage 96 is commonly referred to as Tchebysheff linkage.

Figure 15:
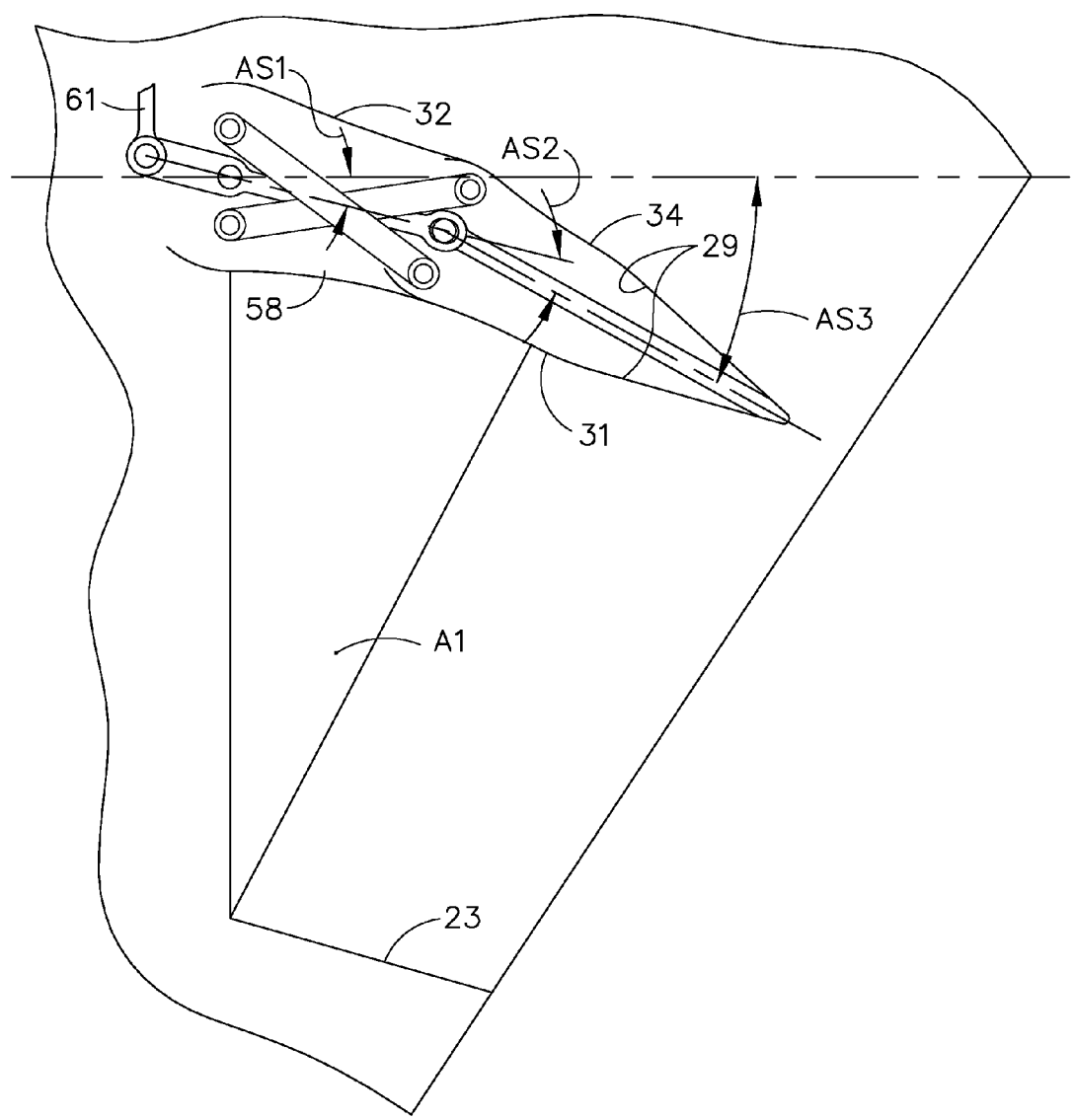
FIG. 15 is a cross-sectional view illustration of the vane illustrated in FIG. 10 and a portion of the of a lower surface of an outer wall of the nozzle illustrated in FIG. 1.

Referring to FIG. 15, the Tchebysheff three bar cross linkage 96 rotates the aft drive link 74 of the articulated contoured exhaust vane 58 at an aft rotational angle AS2 at a fixed ratio to a forward rotational angle AS1 which is set by the forward drive link 70. The forward drive link 70 is rotated to the forward rotational angle AS1 by the actuator 61. The total rotational angle AS3 of the downstream section 34 the articulated contoured exhaust vane 58 is the sum of the forward rotational angle AS1 and the aft rotational angle AS2. This allows the exhaust flow 15 to be turned through a turning area that isn't sharp enough to choke the exhaust flow between the pressure side of the exhaust vane's sidewalls along the upstream and downstream sections 32, 34 and the outer wall 23. This also allows the exhaust flow 15 to be turned through forward and aft suction side angles without causing the exhaust flow 15 to separate along the suction side of the upstream and downstream sections 32, 34.

Figure 17:
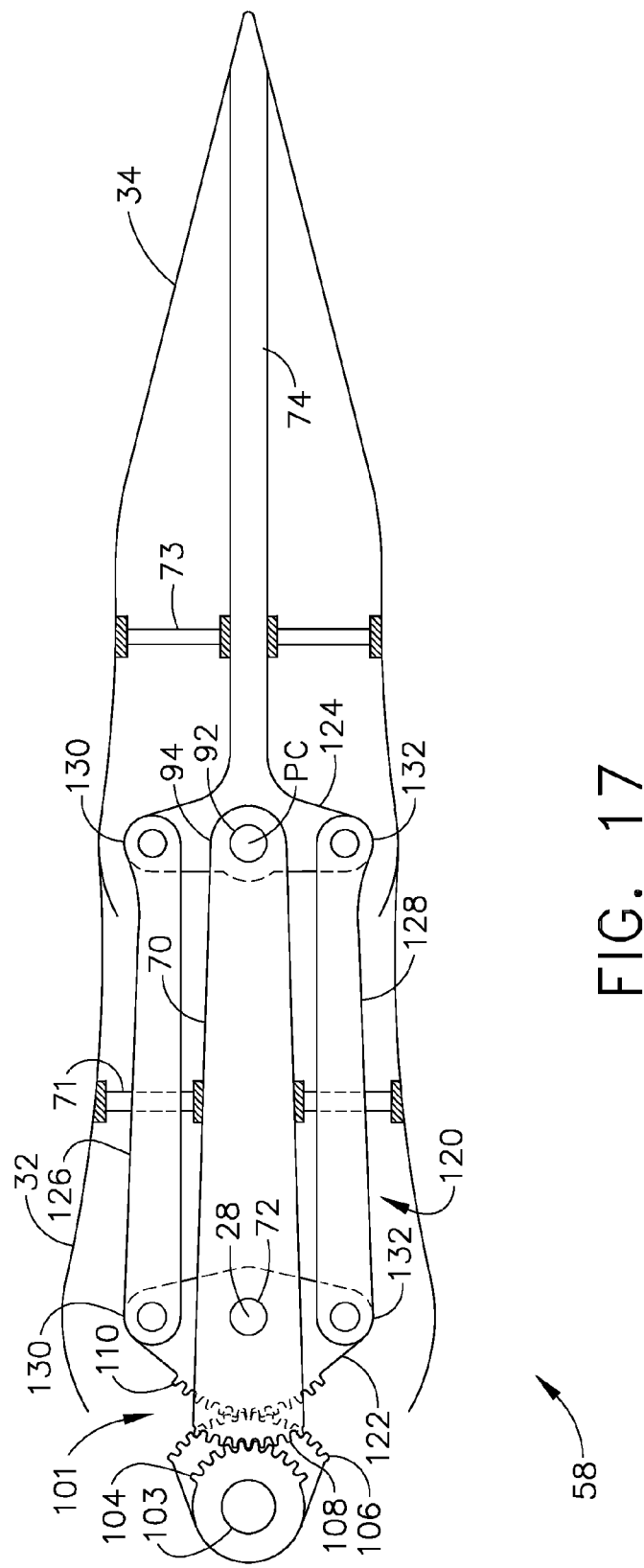
FIG. 17 is a cross-sectional view illustration of an alternative actuation mechanism.

Illustrated in FIG. 17 is an exemplary geared actuation mechanism 101 for actuating the articulated contoured exhaust vane 58. The geared actuation mechanism 101 includes a rotatable drive shaft 103 spaced apart from and parallel to the vane pivot axis by actuators not illustrated in the FIGS. Attached to the drive shaft 103 are first and second drive gears 104, 106 engaging first and second driven gears 108, 110, respectively. The first driven gear 108 is directly connected to the forward drive link 70 and is operable to directly rotate the forward drive link 70 about the vane pivot axis 28.

The upstream section 32 of the articulated contoured exhaust vane 58 is rigidly attached to a forward drive link 70 as illustrated schematically by an upstream ground connection 71 between the upstream section 32 and the forward drive link 70. The downstream section 34 of the articulated contoured exhaust vane 58 is rigidly attached to an aft drive link 74 as illustrated schematically by a ground connection 73 between the downstream section 34 and the aft drive link 74.

A four bar linkage 120 is used to further rotate the aft drive link 74 in a fixed ratio to rotation of the forward drive link 70. The four bar linkage 120 includes a forward pivotable bar 122 pivotably mounted on a forward pin 72 which is fixedly connected to the outer wall 23. An aft pivotable bar 124 is fixedly connected and generally perpendicular to the aft drive link 74 and illustrated herein as being integral with the aft drive link 74. Thus the aft pivotable bar 124 is pivotably connected to the forward drive link 70 along the second pivot axis 38 by an aft pivotal joint 92 at an aft pivot point PC at a downstream end 94 of the forward drive link 70. Thus, the aft pivotable bar 124 is pivotable about the aft pivot point PC. Left and right bars 126, 128 are pivotably connected to left and right ends 130 and 132 of the forward and aft pivotable bars 122 and 124, respectively. When the drive shaft 103 is rotated, the first and second drive gears 104, 106 are rotated and in turn rotates the first and second driven gears 108, 110 which rotate or pivot the upstream and downstream sections 32, 34, respectively.

Figure 18:
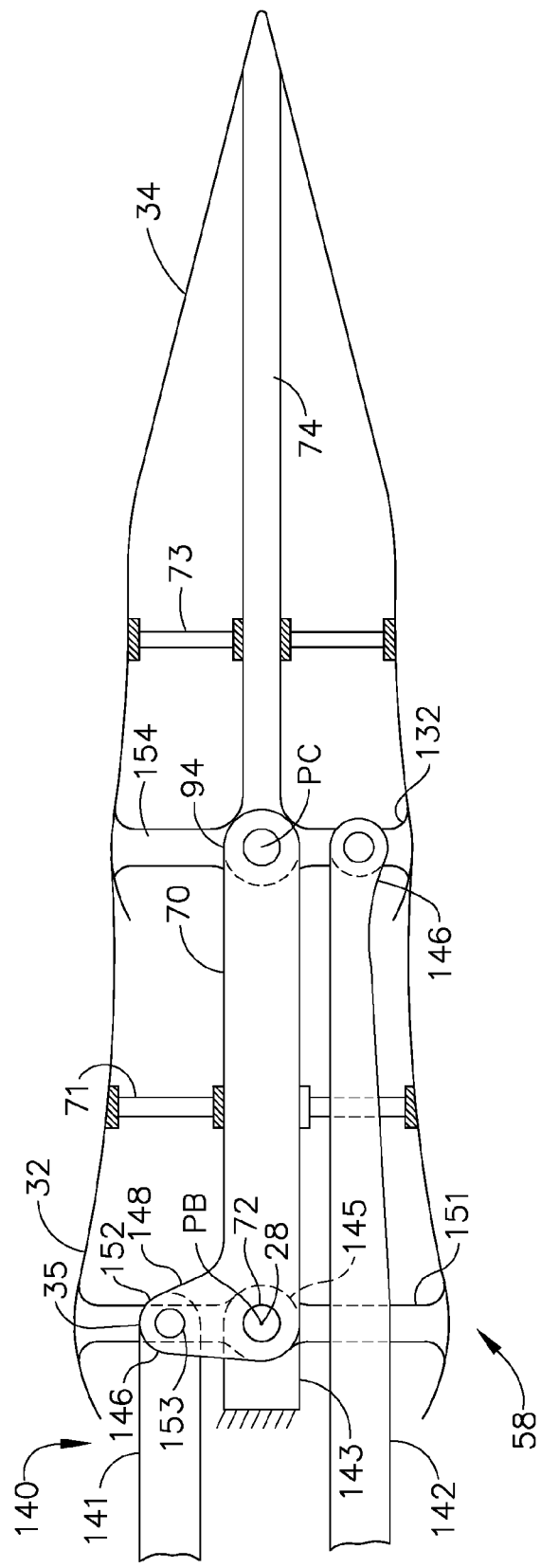
FIG. 18 is a cross-sectional view illustration of another alternative actuation mechanism.

Illustrated in FIG. 18 is an exemplary levered actuation mechanism 140 for actuating the articulated contoured exhaust vane 58. The levered actuation mechanism 140 includes forward and aft linear actuators indicated by their respective forward and aft actuator rods 141, 142. The forward and aft linear actuators may be disposed within the hollow center strut 14 which is illustrated in FIG. 3. The forward drive link 70 is a lever which is pivotably mounted on a forward pin 72 at a mid pivot point PB which coincides with the vane pivot axis 28. The forward pin 72 is fixed with respect to the outer wall 23 as indicated schematically by a pivotable joint ground connection 143 at a pivotable joint 145 which rotatably supports the forward pin 72. The forward pin 72 may be free to rotate about its axis which is the vane pivot axis 28. A forward pivotable bar 151 is fixedly attached to the upstream section 32 of the articulated vane 58 and is pivotable or rotatable about the forward pin 72. The forward actuator rod 141 is pivotably connected to a left end 152 of a forward lever arm 148 of the forward drive link 70 by a forward pivotal joint having a trunnioned pin 153. The trunnioned pin 153 pivotably connects the forward actuator rod 141, the forward lever arm 148 of the forward drive link 70, and the forward pivotable bar fixedly attached to the upstream section 32.

Thus, linear or axial movement of the forward actuator rod 141 causes the forward drive link 70 to pivot or rotate at the mid pivot point PB and pivot or rotate the upstream section 32 about the forward pin 72. The aft drive link 74 is perpendicular to and fixedly connected to an aft pivotable bar 154 and illustrated herein as being integral with the aft pivotable bar 154 which is fixedly connected to the downstream section 34 of the articulated contoured exhaust vane 58. An aft pivotable bar 154 is pivotably connected to the downstream end 94 of the forward drive link 70 by an aft pivotal joint 92 along the second pivot axis 38. The aft pivotal joint 92 is located at an aft pivot point PC at a downstream end 94 of the forward drive link 70. The aft pivotal joint 92 pivotably connects both the aft pivotable bar 154 and the aft drive link 74 to the forward drive link 70. Thus, the aft pivotable bar 154 and the downstream section 34 are pivotable about the aft pivot point PC or the second pivot axis 38 which is rotatable about the mid pivot point PB which coincides with the vane pivot axis 28. When the forward drive link 70 rotates, the aft pivot point PC also rotates about the mid pivot point PB which coincides with the vane pivot axis 28. The aft actuator rod 142 is pivotably connected at its aft end 146 to a right end 132 of the aft pivotable bar 154. Linear or axial movement of the aft actuator rod 142 causes the aft pivotable bar 154 and the aft drive link 74 to which it is fixedly connected to pivot or rotate about the aft pivot point PC and, thus, further rotate the downstream section 34 about the aft pivot point PC. Axial movement of the forward actuator rod 141 rotates the upstream and downstream sections 32, 34 about the mid pivot point PB and the vane pivot axis 28. Axial movement of the aft actuator rod 142 further rotates the downstream section 34 about the aft pivot point PC.

Figure 19:
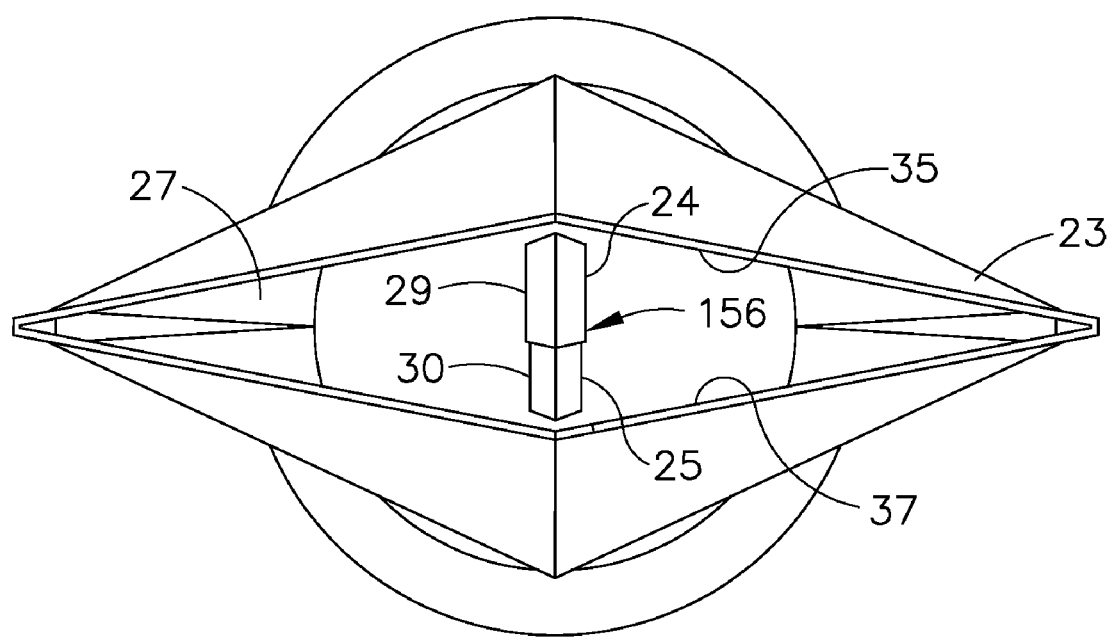
FIG. 19 is an elevational aft looking forward view illustration of the nozzle in FIG. 1 with a sideways pivotable telescoping exhaust vane.
Figure 20:
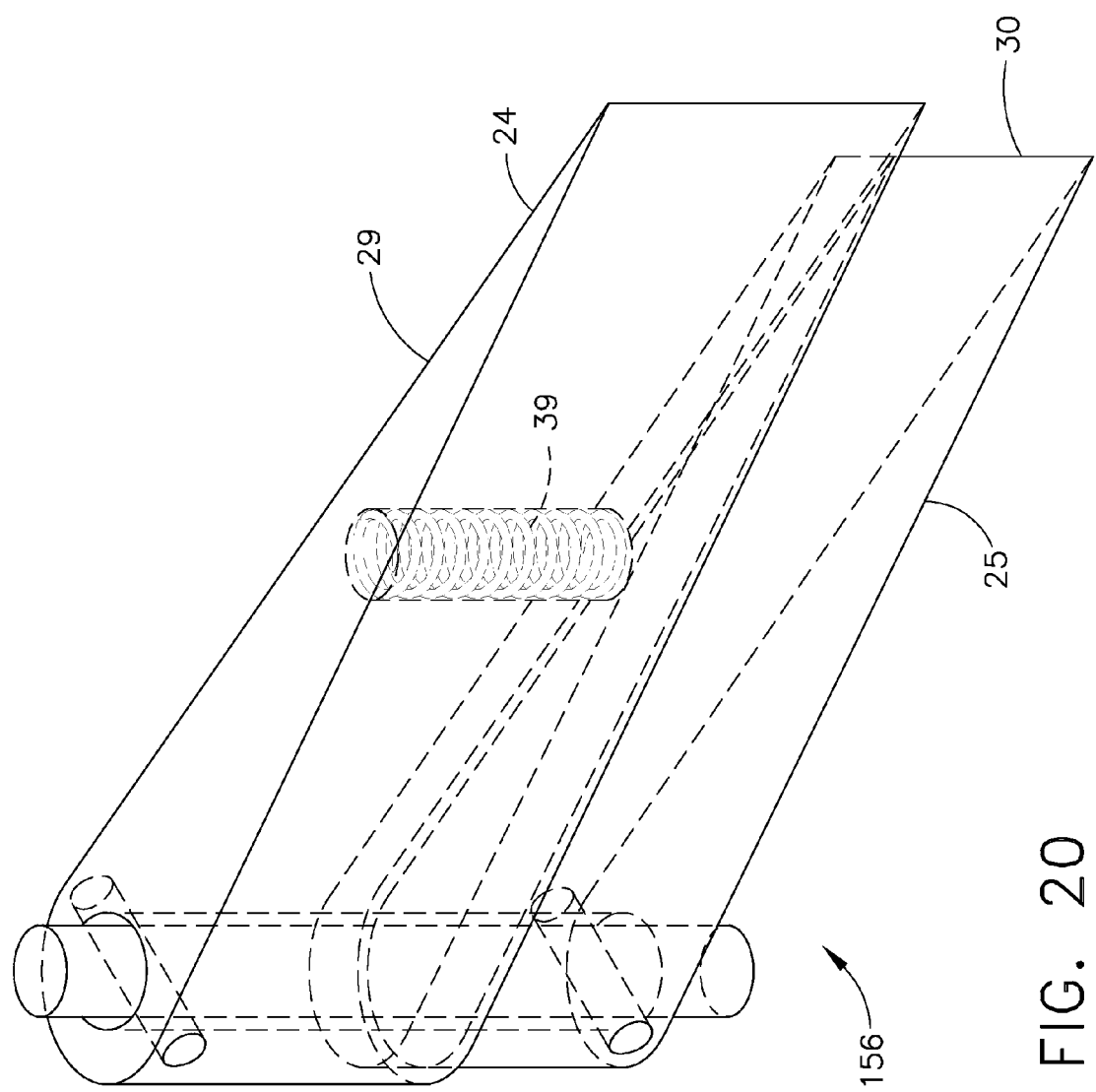
FIG. 20 is a perspective view illustration of the sideways pivotable telescoping exhaust vane illustrated in FIG. 19.

Illustrated in FIGS. 19 and 20 is another embodiment of the exhaust vane 26 referred to herein as a telescoping exhaust vane 156. Transversely biased apart upper and lower vane sections 29, 30 extend transversely inwardly from the upper and lower tips 24, 25, respectively. A first one of the upper and lower vane sections 29, 30 is hollow and a second one of the upper and lower vane sections 29, 30 is partially disposed within and in sliding engagement with the first one of the upper and lower vane sections 29, 30. The lower vane section 30 is illustrated herein as being partially disposed within and in sliding engagement with the upper vane section 29. A spring 39 provides an exemplary means of transversely biasing the upper and lower vane sections 29, 30 apart. Transversely spaced apart upper and lower tips 24, 25 of the exhaust vane 26 sealingly engage the nozzle outer wall 23 along the upper and lower surfaces 35, 37 of the outer wall 23. The telescoping exhaust vane 156 may include flat vane sidewalls 20 or contoured vane sidewalls 33 and, if the vane sidewalls are contoured, then the vane sidewalls may be concave.

Figure 21:
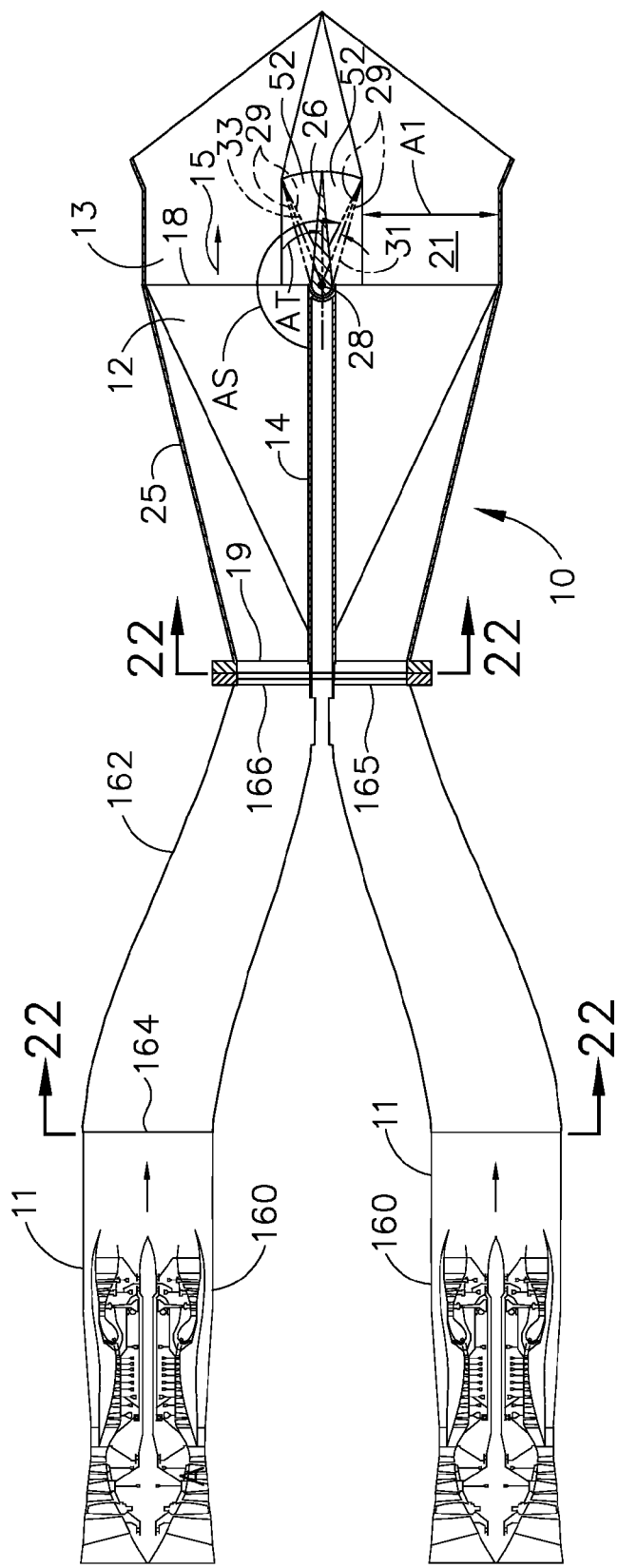
FIG. 21 is a cross-sectional view illustration of the yaw vectoring exhaust nozzle illustrated in FIG. 1 connected to two aircraft gas turbine engines.
Figure 22:
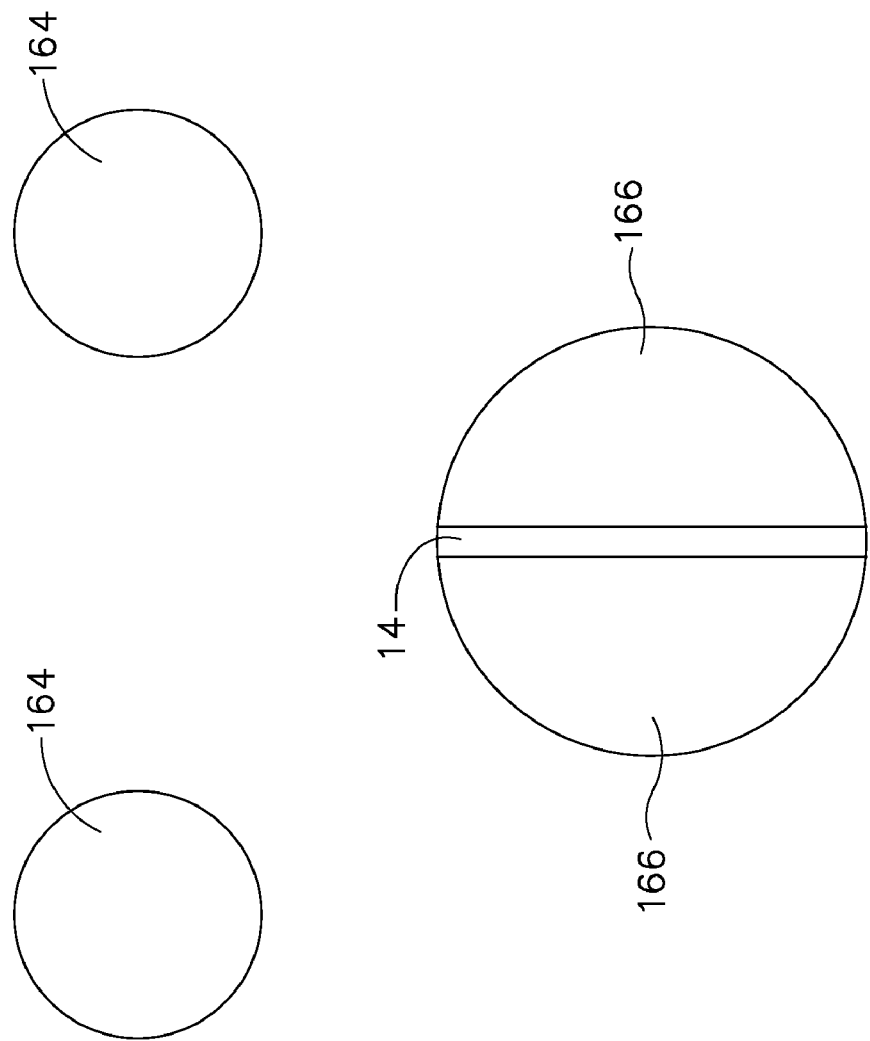
FIG. 22 is a cross-sectional diagrammatical view illustration of the yaw vectoring exhaust nozzle illustrated in FIG. 1 connected to two aircraft gas turbine engines.

Illustrated in FIGS. 21 and 22 is the yaw vectoring exhaust nozzle 10 connected to engine exhaust ducts 11 of two aircraft gas turbine engines 160 illustrating the capacity of one yaw vectoring exhaust nozzle 10 to be used with two or more engines. A transition duct 162 includes trunks 170 which transition exhaust flow circular cross-sectional areas 164 of the two aircraft gas turbine engines 160 to two D shaped cross-sectional areas 166 at the hollow center strut 14 which serves as a flow splitter. The two D shaped cross-sectional areas form the circular shape at the nozzle inlet 19.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed:

1. A gas turbine engine yaw vectoring exhaust nozzle comprising:
    an unvectored nozzle throat, a divergent section having a nozzle outer wall extending longitudinally downstream from the throat, and an exhaust vane being sideways pivotable about a vane pivot axis extending transversely between upper and lower surfaces of the nozzle outer wall and extending transversely in the divergent section between the upper and lower surfaces.

2. A vectoring exhaust nozzle as claimed in claim 1 further comprising the vane pivot axis being centrally located at the nozzle throat.

3. A vectoring exhaust nozzle as claimed in claim 1 further comprising the exhaust vane having transversely spaced apart upper and lower tips in sealing engagement with the nozzle outer wall.

4. A vectoring exhaust nozzle as claimed in claim 3 further comprising the exhaust vane having transversely biased apart upper and lower vane sections extending transversely inwardly from the upper and lower tips respectively.

5. A vectoring exhaust nozzle as claimed in claim 4 further comprising a first one of the upper and lower vane sections being hollow and a second one of the upper and lower vane sections being partially disposed within and in sliding engagement with the first one of the upper and lower vane sections.

6. A vectoring exhaust nozzle as claimed in claim 1 further comprising the vane pivot axis being centrally located at the nozzle throat.

7. A vectoring exhaust nozzle as claimed in claim 1 further comprising the exhaust vane having contoured vane sidewalls.

8. A vectoring exhaust nozzle as claimed in claim 7 further comprising the contoured vane sidewalls being concave.

9. A vectoring exhaust nozzle as claimed in claim 1 further comprising the vane pivot axis being centrally located at the nozzle throat.

10. A vectoring exhaust nozzle as claimed in claim 9 further comprising the exhaust vane having transversely spaced apart upper and lower tips in sealing engagement with the nozzle outer wall.

11. A vectoring exhaust nozzle as claimed in claim 10 further comprising the exhaust vane having transversely biased apart upper and lower vane sections extending transversely inwardly from the upper and lower tips respectively.

12. A vectoring exhaust nozzle as claimed in claim 11 further comprising a first one of the upper and lower vane sections being hollow and a second one of the upper and lower vane sections being partially disposed within and in sliding engagement with the first one of the upper and lower vane sections.

13. A vectoring exhaust nozzle as claimed in claim 1 further comprising:
the exhaust vane including sideways separately pivotable upstream and downstream sections,
the upstream section being pivotable about the vane pivot axis, and
the downstream section being pivotable about a second pivot axis downstream and parallel to the vane pivot axis.

14. A vectoring exhaust nozzle as claimed in claim 13 further comprising:
the upstream section having a downstream end,
the downstream section having an upstream end,
a first one of the upstream and downstream ends being nested within a second one of the upstream and downstream ends, and
the first one of the upstream and downstream ends having a concave end surface and the second one of the upstream and downstream ends having a convex end surface.

15. A vectoring exhaust nozzle as claimed in claim 14 further comprising at least one cooling air injection slot for injecting cooling air to be entrained in a boundary layer along vane sidewalls of the downstream section.

16. A vectoring exhaust nozzle as claimed in claim 13 further comprising the upstream and downstream sections having contoured vane sidewalls.

17. A vectoring exhaust nozzle as claimed in claim 16 further comprising the contoured vane sidewalls being concave.

18. A vectoring exhaust nozzle as claimed in claim 1 further comprising the vane pivot axis being centrally located at the nozzle throat.

19. A vectoring exhaust nozzle as claimed in claim 16 further comprising:
the upstream section having a downstream end,
the downstream section having an upstream end,
a first one of the upstream and downstream ends being nested within a second one of the upstream and downstream ends, and
the first one of the upstream and downstream ends having a concave end surface and the second one of the upstream and downstream ends having a convex end surface.

20. A vectoring exhaust nozzle as claimed in claim 19 further comprising at least one cooling air injection slot for injecting cooling air to be entrained in a boundary layer along vane sidewalls of the downstream section.

21. A vectoring exhaust nozzle as claimed in claim 13 further comprising the upstream and downstream sections having transversely spaced apart upper and lower tips in sealing engagement with the nozzle outer wall.

22. A vectoring exhaust nozzle as claimed in claim 21 further comprising the upstream and downstream sections having transversely biased apart upper and lower vane sections extending transversely inwardly from the upper and lower tips respectively.

23. A vectoring exhaust nozzle as claimed in claim 22 further comprising a first one of the upper and lower vane sections being hollow and a second one of the upper and lower vane sections being partially disposed within and in sliding engagement with the first one of the upper and lower vane sections.

24. A vectoring exhaust nozzle as claimed in claim 1 further comprising sweep areas along upper and lower surfaces of the outer wall and the upper and lower surfaces being contoured to accommodate a maximum amount of pivoting of the exhaust vane about the vane pivot axis.

25. A vectoring exhaust nozzle as claimed in claim 24 further comprising the exhaust vane having transversely spaced apart upper and lower tips in sealing engagement with the sweep areas.

26. A vectoring exhaust nozzle as claimed in claim 1 further comprising flat sweep areas along upper and lower surfaces of the outer wall and the flat sweep areas being perpendicular to the vane pivot axis.

27. A vectoring exhaust nozzle as claimed in claim 26 further comprising the exhaust vane having transversely spaced apart upper and lower tips in sealing engagement with the sweep areas.

28. A vectoring exhaust nozzle as claimed in claim 13 further comprising a Tchebysheff three bar cross linkage operably connected to the upstream and downstream sections for rotating the upstream and downstream sections through different upstream and downstream angles of rotation respectively with respect to an exhaust flow direction upstream of the exhaust vane.

29. A vectoring exhaust nozzle as claimed in claim 13 further comprising:
a forward drive link pivotably connected to an aft drive link,
an actuator rod operably connected to the forward drive link at a forward pivot point at an upstream end of the forward drive link,
the upstream section fixedly attached to the forward drive link,
the downstream section fixedly attached to the aft drive link,
left and right forward pivot points relatively fixed with respect to the outer wall,
an aft bar fixedly connected to the aft drive link,
a left to right bar pivotable about the left forward pivot point at a forward end of the left to right bar and extending aftwardly from the left forward pivot point and crossing a right to left bar,
the right to left bar pivotable about the right forward pivot point at a forward end of the right to left bar,
an aft end of the left to right bar pivotably connected to a right end of the aft bar at a right aft pivot point, and
the right to left bar pivotably connected at an aft end to a left end of the aft bar at a left aft pivot point.

30. A vectoring exhaust nozzle as claimed in claim 13 further comprising:
a forward drive link pivotably connected to an aft drive link along the second pivot axis at an aft pivot point at a downstream end of the forward drive link,
the upstream section fixedly attached to the forward drive link,
the downstream section fixedly attached to the aft drive link,
a rotatable drive shaft spaced apart from and parallel to the vane pivot axis,
first and second drive gears attached to the drive shaft and engaged with first and second driven gears respectively,
the first driven gear directly connected to the forward drive link and operable to directly rotate the forward drive link about the vane pivot axis,
a forward pivotable bar pivotably mounted on a forward pin which is fixedly connected to the outer wall,
an aft pivotable bar fixedly connected to and generally perpendicular to the aft drive link, and
left and right bars pivotably connected to left and right ends of the forward and aft pivotable bars respectively.

31. A vectoring exhaust nozzle as claimed in claim 13 further comprising:
a forward drive link pivotably connected to an aft drive link along the second pivot axis at an aft pivot point at a downstream end of the forward drive link,
the upstream section fixedly attached to the forward drive link,
the downstream section fixedly attached to the aft drive link,
a drive shaft rotatable about the vane pivot axis,
first and second drive gears attached to the drive shaft and engaged with first and second driven gears respectively,
the first driven gear directly connected to the forward drive link and operable to directly rotate the forward drive link about the vane pivot axis,
a forward pivotable bar pivotably mounted on a forward pin which is fixedly connected to the outer wall,
an aft pivotable bar fixedly connected to and generally perpendicular to the aft drive link, and
left and right bars pivotably connected to left and right ends of the forward and aft pivotable bars respectively.

32. A vectoring exhaust nozzle as claimed in claim 13 further comprising:
a forward drive link pivotably mounted on a forward pin disposed along the vane pivot axis,
the forward pin being relatively fixed with respect to the outer wall,
the forward drive link pivotably connected to an aft drive link along the second pivot axis at an aft pivot point at a downstream end of the forward drive link,
the upstream section fixedly attached to the forward drive link,
the downstream section fixedly attached to the aft drive link,
a forward actuator rod pivotably connected to an end of a forward lever arm of the forward drive link,
an aft pivotable bar perpendicular to and fixedly connected to the aft drive link,
the aft pivotable bar pivotably connected to the downstream end of the forward drive link along the second pivot axis, and
an aft actuator rod pivotably connected at its aft end to a right end of the aft pivotable bar.

33. An aircraft gas turbine engine propulsion apparatus comprising:
two or more aircraft gas turbine engines in downstream gas communication with a gas turbine engine yaw vectoring exhaust nozzle,
the nozzle including an unvectored nozzle throat and
a divergent section with a nozzle outer wall extending longitudinally downstream from the throat, and
an exhaust vane being sideways pivotable about a vane pivot axis extending transversely between upper and lower surfaces of the nozzle outer wall and extending transversely in the divergent section between the upper and lower surfaces.

34. An apparatus as claimed in claim 33 further comprising a transition duct having trunks that transition exhaust circular cross-sectional areas of the two aircraft gas turbine engines 160 to two D shaped cross-sectional areas at a nozzle inlet to the nozzle.

35. An apparatus as claimed in claim 33 further comprising the vane pivot axis being centrally located at the nozzle throat.

36. An apparatus as claimed in claim 33 further comprising the exhaust vane having transversely spaced apart upper and lower tips in sealing engagement with the nozzle outer wall.

37. An apparatus as claimed in claim 36 further comprising the exhaust vane having transversely biased apart upper and lower vane sections extending transversely inwardly from the upper and lower tips respectively.

38. An apparatus as claimed in claim 37 further comprising a first one of the upper and lower vane sections being hollow and a second one of the upper and lower vane sections being partially disposed within and in sliding engagement with the first one of the upper and lower vane sections.

39. An apparatus as claimed in claim 38 further comprising the vane pivot axis being centrally located at the nozzle throat.

40. An apparatus as claimed in claim 33 further comprising the exhaust vane having contoured vane sidewalls.

41. An apparatus as claimed in claim 40 further comprising the contoured vane sidewalls being concave.

42. An apparatus as claimed in claim 41 further comprising the vane pivot axis being centrally located at the nozzle throat.

43. An apparatus as claimed in claim 42 further comprising the exhaust vane having transversely spaced apart upper and lower tips in sealing engagement with the nozzle outer wall.

44. An apparatus as claimed in claim 43 further comprising the exhaust vane having transversely biased apart upper and lower vane sections extending transversely inwardly from the upper and lower tips respectively.

45. An apparatus as claimed in claim 44 further comprising a first one of the upper and lower vane sections being hollow and a second one of the upper and lower vane sections being partially disposed within and in sliding engagement with the first one of the upper and lower vane sections.

46. An apparatus as claimed in claim 33 further comprising:
the exhaust vane including sideways separately pivotable upstream and downstream sections,
the upstream section being pivotable about the vane pivot axis, and
the downstream section being pivotable about a second pivot axis downstream and parallel to the vane pivot axis.

47. An apparatus as claimed in claim 46 further comprising:
the upstream section having a downstream end,
the downstream section having an upstream end,
a first one of the upstream and downstream ends being nested within a second one of the upstream and downstream ends, and
the first one of the upstream and downstream ends having a concave end surface and the second one of the upstream and downstream ends having a convex end surface.

48. An apparatus as claimed in claim 47 further comprising at least one cooling air injection slot for injecting cooling air to be entrained in a boundary layer along vane sidewalls of the downstream section.

49. An apparatus as claimed in claim 46 further comprising the upstream and downstream sections having contoured vane sidewalls.

50. An apparatus as claimed in claim 49 further comprising the contoured vane sidewalls being concave.

51. An apparatus as claimed in claim 50 further comprising the vane pivot axis being centrally located at the nozzle throat.

52. An apparatus as claimed in claim 49 further comprising:
the upstream section having a downstream end,
the downstream section having an upstream end,
a first one of the upstream and downstream ends being nested within a second one of the upstream and downstream ends, and
the first one of the upstream and downstream ends having a concave end surface and the second one of the upstream and downstream ends having a convex end surface.

53. An apparatus as claimed in claim 52 further comprising at least one cooling air injection slot for injecting cooling air to be entrained in a boundary layer along vane sidewalls of the downstream section.

54. An apparatus as claimed in claim 46 further comprising the upstream and downstream sections having transversely spaced apart upper and lower tips in sealing engagement with the nozzle outer wall.

55. An apparatus as claimed in claim 54 further comprising the upstream and downstream sections having transversely biased apart upper and lower vane sections extending transversely inwardly from the upper and lower tips respectively.

56. An apparatus as claimed in claim 55 further comprising a first one of the upper and lower vane sections being hollow and a second one of the upper and lower vane sections being partially disposed within and in sliding engagement with the first one of the upper and lower vane sections.

* * * * *